United States Patent
Jensen (10) Patent No.: US 7,972,423 B2
(45) Date of Patent: Jul. 5, 2011

(54) RECTIFICATION APPARATUS USING A HEAT PUMP

(75) Inventor: Erik Jensen, Dyssegård (DK)

(73) Assignee: Holm Christensen Biosystemer APS, Alsgarde (DK)

( * ) Notice: Subject to any disclaimer, the term of this patent is extended or adjusted under 35 U.S.C. 154(b) by 865 days.

(21) Appl. No.: 11/919,400

(22) PCT Filed: Apr. 28, 2006

(86) PCT No.: PCT/DK2006/000228
§ 371 (c)(1),
(2), (4) Date: Dec. 20, 2007

(87) PCT Pub. No.: WO2006/114104
PCT Pub. Date: Nov. 2, 2006

(65) Prior Publication Data
US 2009/0308100 A1    Dec. 17, 2009

(30) Foreign Application Priority Data

Apr. 28, 2005   (DK) .......................... PA 2005 00622

(51) Int. Cl.
B01D 19/00    (2006.01)
(52) U.S. Cl. ................ 96/234; 96/214; 96/217; 96/218; 95/165; 95/236; 95/249; 95/252
(58) Field of Classification Search .................... 62/617; 165/147, 166; 96/281–287, 234, 214, 217, 96/218; 95/165, 209, 236, 249, 252
See application file for complete search history.

(56) References Cited

U.S. PATENT DOCUMENTS 3,339,631 A * 9/1967 McGurty et al. ............ 165/109.1
3,749,155 A * 7/1973 Buffiere ........................ 165/147

4,156,625 A * 5/1979 Wachendorfer, Sr. ........ 156/245
(Continued)

FOREIGN PATENT DOCUMENTS
DE            43 24 410           8/1994
(Continued)

Primary Examiner — Duane Smith
Assistant Examiner — Ives Wu
(74) Attorney, Agent, or Firm — The Nath Law Group; Jerald L. Meyer; Jianxiao Zhang (57) ABSTRACT

An apparatus for stripping and strengthening and subsequent condensing and final strengthening of an easily vaporizable component of a preferably aqueous mixture permits the heat necessary for stripping and strengthening to be transferred through a common heat transmission body (3), where the heat is derived from condensing the vapor generated by stripping and strengthening, which vapor via compression using a heat pump (26) has obtained the increase in boiling point necessary for condensation. The apparatus is comprised of two sections, namely a stripping and strengthening section or first section (1) and a condensing and final strengthening section or second section (2), said sections being joined around a common heat transmission body (3) forming a dividing wall, each section being further defined by a horizontal partially cylindrical housing (13) and an end wall at each end. Each of the sections is provided with an atomizing rotor (4) adapted to throw liquid from each side from the bottom of the horizontal partially cylindrical housing (13) inward against the common heat transmission body, an axial liquid channel (5) providing a continuous passage of liquid through the apparatus extending along the bottom.

5 Claims, 2 Drawing Sheets

U.S. PATENT DOCUMENTS

| | | | |
|---|---|---|---|
| 4,681,661 A | 7/1987 | Govind | |
| 4,715,431 A * | 12/1987 | Schwarz et al. | 165/110 |
| 4,762,171 A * | 8/1988 | Hallstrom et al. | 165/147 |
| 4,785,879 A * | 11/1988 | Longsworth et al. | 165/164 |
| 6,884,284 B1 * | 4/2005 | Jensen | 96/281 |
| 7,111,673 B2 * | 9/2006 | Hugill | 165/166 |
| 2004/0200602 A1 | 10/2004 | Hugill | |

FOREIGN PATENT DOCUMENTS

| | | | |
|---|---|---|---|
| EP | 1380328 | * | 7/2003 |
| EP | 1 380 328 | | 4/2007 |
| WO | 91/01784 | | 2/1991 |
| WO | WO 91/01784 | * | 2/1991 |
| WO | 97/18023 | | 5/1997 |
| WO | 00/51702 | | 9/2000 |

* cited by examiner

FIG 1

RECTIFICATION APPARATUS USING A HEAT PUMP

TECHNICAL FIELD

The invention relates to an apparatus for stripping and strengthening and a subsequent condensing and final strengthening of an easily vaporizable component of a preferably aqueous mixture, wherein the heat necessary for stripping and strengthening is transferred through a common heat transmission body. The heat stems from condensing the vapour generated by stripping and strengthening, which vapour via compression using a heat pump has obtained the increase in boiling point necessary for condensation.

DISCLOSURE OF INVENTION

According to the invention the apparatus is comprised of two sections, namely a stripping and strengthening section or first section and a condensing and final strengthening section or second section, said sections being joined around a common heat transmission body forming a dividing wall, and each section being further defined by a substantially horizontal partially cylindrical housing and an end wall at each end, and where each of said sections is provided with an atomizing rotor adapted to throw liquid from each side from the bottom of the horizontal partially cylindrical housing inward against the common heat transmission body, an axial liquid channel providing a continuous passage of liquid through the apparatus extending along the bottom.

The function of the apparatus is characterised in that the contact between liquid, vapour and heat transmission surface is achieved by the liquid mixture being thrown against said surface by means of the atomizing rotor, thereby stripping and strengthening the easily vaporizable portion. The generated vapour is made to condense in the second section by means of the heat pump, thus giving off heat to the continuing evaporation process. Condensation takes place by means of direct contact between the vapour and the heat transmission surface, said surface thus acting as a cooling surface, and by cooling the resulting condensate together with the recirculated condensate and after returning to the atomizing rotor bringing it into contact with the warmer vapour by means of recirculation. Thus, an additional condensation of the vapour is obtained, and in both cases, the condensate has a higher concentration of the aqueous portion than in the vapour, and the remaining vapour has been subject to a double strengthening effect as to the concentration of the easily vaporizable portion of the vapour during a single recirculation of the condensate. By establishing a sufficient number of recirculations a complete stripping of the easily vaporizable portion may be accomplished and for certain products a complete condensation of the vapour. The described process sequences can only be accomplished by achieving a continuous flow of both liquid and vapour, this being obtained by means of an axial liquid channel.

The apparatus is usable for many different mixtures, the focus, however, being directed towards aqueous mixtures containing ethanol or ammonia, where mixtures of ammonia and water are particularly difficult to treat, since in the latter case, the difference in boiling points is approx. 133° C., whereas the difference is only approx. 22° C. for ethanol and water at atmospheric pressure.

Rectification plants still use evaporators containing pipes as heat transfer surfaces, said evaporators being designed as down draught evaporators or as recirculation evaporators, the greatest disadvantage of the method being that the entire evaporation takes place with a remanence that has obtained its final concentration. The same disadvantage is mentioned in connection with the plate-type heat exchangers having found a certain use recently. The stripping section of a conventional column with bell-shaped bottoms, sieve bottoms or contact inserts of different types may become clogged, since there is a large quantity of dry matter capable of forming encrustations, which again can fall off, thus clogging the liquid passage. In connection with such systems, it may be necessary to start with decantation or filtration, which may be expensive to carry out, and the removed dry matter will not be stripped.

The system with atomizing rotor throwing the liquid against a heat transmission surface provides several advantages. The rotor may be designed as described in EP 1 185 346 B1, i.e. constructed with a central tube-shaped supporting mid-section provided with a suitable number of U-shaped pockets welded thereto, said pockets being open in the direction of rotation of the rotor. At the bottom of the container, the outer edges of the pockets dip a few millimetres into the liquid, said pockets thus collecting liquid which is thrown outward by centrifugal forces during continued rotation, said liquid forming a concentrated cloud of small droplets from the edges of the pockets towards the inner side of the housing wall and impacting on the surface of the heat transmission surface. The cloud rotates with the speed of the atomizing rotor, while the droplets are thrown outward with a velocity of approx. 10 m/s, thus a relative difference in velocity between liquid and vapour of an average up to 30 m/s is obtained, thus resulting in an effective contact between liquid and vapour, whereby an equilibrium between the easily vaporizable portion in the liquid and in the vapour is obtained for each recirculation.

Such a system, where the liquid is brought into contact with the heat transmissions surface under great force by means of the atomizing rotor, additionally has the effect that the apparatus is capable of treating liquids with a large quantity of dry matter without developing encrustations on the evaporator surface and thereby reducing heat transmission, and the heat transmission surface is thus designed so that the entire surface is sprayed directly. This is accomplished by manufacturing said surface from a sheet material, said material being folded into V-shaped vertical folds in a manner known per se, the openings of said folds alternately facing the atomizing rotors in the two sections. With larger units, it may be advantageous to manufacture the heat transmission surface from rectangular sheets welded together so that they form V-shaped surfaces. If the heat transmission body is made from piping, only the side facing the atomizer remains free of encrustations. Thus, the system provides a major advantage compared to conventional systems, i. a. by keeping the heat transmission surfaces free of encrustations.

In conventional vertical stripping columns with bell-shaped bottoms, sieve bottoms or various contact inserts, the liquid flow is only driven by gravity and can thus only work with liquid mixtures containing a minor quantity of substances capable of forming encrustations, for which reason a pre-treatment of decantation or filtration is necessary, resulting in increased investment costs and energy consumption. Evaporators (reboilers) for such systems operate by evaporating the component with the highest boiling point, and it is thus not possible to utilise the fairly large rise in temperature, which may occur, when stripping the easily vaporizable portion of certain liquid mixtures. This problem has been solved by stripping and strengthening taking place in the same volume while simultaneously achieving a continuously proceeding countercurrent effect The advantage of having an effective countercurrent between liquid and vapour during stripping is achieved by means of liquid channels characterised by the features of claim 2. Preferably, they extend along the entire length of the apparatus and sealingly abut the two end surfaces with inlet and outlet connections at opposite ends of the channels. The channel is suitably formed by means of a rectangular plate forming the one side of the V-shaped channel, while the second side is provided by the inner side of the partially cylindrical housing. At its upper edge, the plate is pivotably retained at a suitable distance to the housing wall, while the bottom edge is retained by means of adjustable mechanisms so that a gap is formed between the plate and the inner wall. The channel is formed at a suitable distance from the bottom of the housing, where the atomizing rotor is mounted so that the liquid thrown outward against the part of the inner wall positioned above the channel flows back into the channel. Here, some of the liquid together with liquid, which in the meantime has flown forward, flows to the atomizing rotor through the gap at the bottom in order to be thrown outward again. The remaining part of the liquid flows forward axially in the channel and to the next step of the process in order to be finally removed from the apparatus as remanence.

Furthermore, the apparatus according to the invention has the features disclosed in claim 3. Thus, there is a countercurrent in the condensing section between the forward-flowing condensing vapour and the portion of the condensate withdrawn as reflux at the end of the apparatus, where the compressed vapour is supplied. The remaining condensate together with the condensing vapour flows towards the opposite end of the apparatus, where the condensate is withdrawn as product, and where there is a connection for venting the apparatus.

Since both the bottoms of the two sections and the atomizing rotors are mounted horizontally, the entire axial movement of the liquid takes place in the channel, where liquid is supplied to the atomizing rotor by controlling the gap width. The velocity of the vapour flowing through the apparatus may optionally vary a little across the cross-section of the apparatus due to influences from the recirculating liquid, but the portion flowing with the greatest velocity has a somewhat lower concentration of easily vaporizable liquid in the vapour, this being partly counterbalanced by the fact that the exchange of matter and temperature between liquid and vapour is increased as a consequence of the larger difference in concentrations.

Use of the apparatus for stripping and strengthening of ethanol is simpler than the treatment of mixtures having a content of nitrogen and $CO_2$ gas, where complete condensation of ammonia cannot be achieved, partly because of the large difference in boiling points and partly because of the contents of $CO_2$ gas. Thus, the novel system possesses the important advantage that liquid can both be supplied and withdrawn from the axial liquid channel, the apparatus thereby being able to absorb ammonia and strip the $CO_2$ gas.

Treatment of fermentation broth with bio-ethanol.

In the stripping and strengthening section of the apparatus, the one-step operation begins with throwing out the liquid from the atomizing rotor, thus achieving contact between the liquid and the vapour corresponding to the contact in one step of a conventional rectification column, but with a single recirculation of the liquid, the liquid impacts on the heat transmission surface, where in the beginning the generated vapour has a considerably higher concentration of ethanol than the liquid from where the vapour is generated. Thus, stripping and strengthening result in twice the output, and the reflux can be reduced by approximately half, thus obtaining a corresponding decrease in energy consumption.

After compression, the vapour thus generated by stripping and strengthening is supplied to a condensing section and comes into contact with the heat transmission surface, which here acts as a cooling surface, and the resulting condensate has a higher concentration of water than the vapour having formed the condensate. The remaining vapour has thus obtained an increased concentration of ethanol. At the same time, the obtained condensate is cooled down together with the recirculated condensate, and when it is has flown to the atomizing rotor and is thrown outward, this results in an additional condensation of the vapour by means of contact with the warmer vapour and a corresponding strengthening of the remaining vapour. Again, double effect is thus obtained by a single recirculation of the concentrate.

If the highest possible ethanol concentration is to be obtained using this process, the process can be carried out in different manners. If as large a part of the strengthening as possible is to take place during condensation, less reflux is necessary, but it has been found that the mixture to be evaporated has a higher water content than is obtained with complete strengthening in section 1, thus causing a lower energy consumption for the evaporation. To get an idea of the theoretical energy consumption a calculation by means of a McCape-Thiele-diagram can be performed, where the calculations are based on mol. Starting with e.g. 10,000 kg fermentation broth having a quantity of pure ethanol of 1,000 kg, which can only be strengthened up to 88 mol-% due to the eutectic point, the original concentration being approx. 4.16 mol-%, said concentration being in equilibrium with vapour having an ethanol concentration of approx. 29 mol-%, reflux plus product can be approx. 88/22=4 in a conventional column, but since the system operates with approximately double effect, reflux plus product can be expected to be 2. Thus, the vapour to be compressed is:

$$1000 \text{ kg}/46 \text{ kg/kmol} \times (100/88) \times 2 = 49.41 \text{ kmol}.$$

Applying a suction pressure of 0.5 ata and a counterpressure of 1.5 ata results in a vapour volume of $22.4 \times 49.41 \times 336/273° C. \times 1/0.5 = 2725 \text{ m}^3/\text{h}$.

The energy consumption is: $1.4/0.4 \times 5000 \times 2725/3600 \times (-1+(1.5/0.5)^{(0.4/1.4)}) = 4884 \text{ kgm/s} = 47.9 \text{ kW/h}$ $$47.9 \text{ kW/h}/(1000/0.95 \text{ kg/l}) = 0.0455 \text{ kW/kg 95 weight-\% ethanol} = 0.036 \text{ kW/l 95 weight-\% ethanol}.$$

Assuming a price of approx. 0.45 DKK/kWh, which is not unusual for such a purpose, the cost for 1 l ethanol is 0.016 DKK, based on an efficiency of 100%, assuming that a comparatively good efficiency is obtainable.

Having thus brought the vapour up close to the eutectic composition in the stripping and strengthening section, the final part of the strengthening may advantageously take place in the condensing section and without any cost by dimensioning the atomizing rotor with the necessary number of recirculations of the condensate. Moreover, while the temperature of the remanence at the outlet corresponds to the boiling point of water, the temperature is not more than 1 degree above the boiling point of ethanol, or approx. 20 to 22° C. below the boiling point of water, at the outlet of the vapour to the heat pump. In conventional plants with rectification column, reboiler and heat pump, it is only the remanence that is evaporated, and it is only the steam with the maximum concentration of ethanol that is condensed, and manufacturers state openly that it is most economic to let the heat pump operate with a low temperature or pressure differential. In principle, the heat pump operates at the same suction or condensation pressure, both with the novel and the conventional system, in the latter case, however, a considerable pressure drop has to be expected when steam flows through the columns because of their height of up to 30 m.

Here, the position of the heat transmission body inside the process volume of the novel system is advantageous in that the temperature difference is on an average 10 to 11° C. higher, and hence, the available temperature difference for the old system is approx. 7° C., and 7+10.5° C. for the novel system. When dimensioning the heat transmission surfaces of the two systems, provided that they have the same capacity and that the heat transmission coefficient is identical in both systems, you get:

Area, novel system,×17.5° C.=area, old system,×7° C., thus getting:

Area, novel system=area, old system× (7/17.5=0.40=40%), but since both stripping and strengthening in the new system have twice the output, this means that since the process takes place in the process volume itself, it is possible to achieve the same capacity as with the old system by using a heat transmission surface having an area of approx. 20% of the area necessary with the old system, and thus to achieve a considerable saving in investment costs.

The contact between the recirculated condensate and the vapour is particularly effective, and hence there is no doubt that the system is operational. An important detail in this context is that the continuous passage of the condensate through the apparatus is controlled by means of the axial liquid channel, and if pipe connections are established at both ends of the channel, it is possible to extract a part of the condensate in countercurrent with the steam, which corresponds to the reflux quantity. At the opposite end of the apparatus, where the last part of the steam is condensed, it is thus possible to extract product with a maximum of approx. 88 mol-% ethanol.

As a result of parallel temperatures for stripping and condensing, the energy consumption is particularly low, added to which is the fact that there are no expenses for establishing a conventional stripping and strengthening column, where said expenses can by considerable, as these are columns with a height of up to 30 m, and with a major loss when vapour flows through the column, the loss being dependent on the type of contact insert selected, but in any case resulting in an increased energy consumption.

With each step, where the vapour moves towards obtaining identical ethanol concentrations in both condensate and vapour, the increase in ethanol concentration becomes smaller, and the higher the desired concentration to achieve, the more steps have to be established. Thus, the necessary reflux quantity depends both on this and on the concentration of the raw product at the inlet of the apparatus. Reflux plus product can, for example, be 2, where 50% of the condensate have to be recirculated to the stripping section, while the remaining 50% vapour is condensed in parallel with the condensate being extracted as product, and it is sufficient to apply a considerably reduced number of steps for the strengthening and thus a decrease in reflux quantity, temperature and pressure differential, all resulting in considerable energy savings.

Mixtures comprising a quantity of ammonia to be separated require a treatment which is dependent on the ammonia concentration in the mixture. Liquid manure, for example, has a comparatively small concentration, while considerably higher concentrations are involved when utilizing the ability of the ammonia/water mixture to absorb $CO_2$ in the form of ammonium bicarbonate.

After exposure to degasification, liquid manure has a nitrogen content of approx. 0.3%, predominantly present in the form of ammonium bicarbonate. When heated to above 70° C., it dissociates to $CO_2$ and an aqueous mixture of ammonium and ammonia. If liquid manure has been pre-warmed to the boiling point at the inlet to the stripping section of the apparatus, said liquid manure generates a vapour upon subsequent heat supply when in contact with the heat transmission surface, said vapour having an ammonia concentration in equilibrium with the ammonia in the liquid manure, i. e. the concentration in the vapour is approx. 10 times higher than in the liquid manure having generated the vapour. During the flow of liquid manure towards the remanence outlet, including being repeatedly thrown outward against the heat transmission surface, and upon each contact therewith, the liquid manure generates a quantity of vapour having an ammonia concentration in equilibrium with the evaporating liquid manure, i.e, if the liquid manure comprises 0.1% ammonia, the generated vapour contains approx. 1%, a ratio applying to a comparatively large range. Upon contact with the heated surface, the liquid manure flows back to the atomizing rotor and is thrown outward again, thus coming into intimate contact with the vapour flowing in countercurrent, said vapour having a higher temperature and a smaller ammonia concentration, thus resulting in an additional transfer of ammonia from the liquid manure to the vapour. Stripping requires thermal energy for stripping both the supplied liquid as well as the optionally required reflux. For carrying out this process, it is a condition that the stripping progresses continuously with repeat recirculation of the liquid manure, this being achieved by the liquid manure passing through the apparatus in the axial channel. Concurrently with countercurrent evaporation, the stripped vapour flows back to the liquid manure inlet to continue therefrom to the next section of the process together with $CO_2$ gas, which is neither bound to the liquid manure nor to the vapour, and thus having practically no influence on the stripping and strengthening.

When the liquid manure has reached the remanence outlet, having generated the ammonia/water vapour, it returns via the free cross-section area of the section, being in constant contact with the recirculated liquid manure, whereby an equilibrium between the ammonia concentration in the liquid manure and in the vapour is maintained at all times. At the same time, this simple construction allows for the possibility of operating with a considerable dry matter content in the liquid manure, of operating as a stripping section and of reducing the energy consumption of the heat pump by achieving complete countercurrent, since equilibrium between liquid manure and vapour is obtained again after centrifuging from the atomizing rotor, and afterwards, when the liquid manure impacts on the heat surface, the generated vapour has a considerably higher ammonia concentration than the liquid manure. One pre-requisite for obtaining a remanence completely free of ammonia, however, is maintaining a high pH-value.

Having been compressed to a suitable condensation temperature, the vapour is circulated to the condensing section at the end of the apparatus, where the temperature is highest. The vapour is circulated continuously through the entire apparatus, while the portion of the condensate corresponding to the countercurrent reflux of the vapour, is circulated back to the evaporation section.

At the same time, the remaining vapour, constituting the product, contains the full amount of $CO_2$ and continues to flow to the opposite end of the apparatus while simultaneously concentrating the $CO_2$ gas, where an amount of water is added sufficient for scrubbing the gas and for absorbing the last remains of ammonia reaching an equilibrium with pure water.

The water together with the obtained condensate flows back in countercurrent to the vapour. In the beginning, there is only a little direct condensation of the ammonia/water vapour because of the high gas content, but the liquid—water and condensate—thrown against the cooling surface is cooled down, and when it is subsequently thrown outward in contact with the warmer vapour, the necessary condensation of the vapour is achieved, and with each recirculation of the liquid a new equilibrium between ammonia in the water and in the vapour is obtained. When the vapour has reached the necessary strength, and the obtained condensate is circulated back to the evaporator section in the form of reflux, an outlet for the stripped ammonia/water mixture is established.

Flue gas containing a quantity $CO_2$ gas, removable by scrubbing with a mixture of ammonia and water, exits in the form of a mixture of ammonium bicarbonate and water. The scrubber disclosed in DK Patent No. 173513 can be used as scrubber, since it is here possible to add liquid media at different places in the axial liquid channel so that the final scrubbing can be carried out with for example pure water.

After having passed the scrubber, the liquid mixture is refluxed to the apparatus for decomposition of ammonium bicarbonate into $CO_2$ gas and ammonia, and since scrubbing can be carried out with a considerably higher ammonia concentration in the scrubbing liquid than in the liquid manure, stripping alone, or perhaps a very modest reflux, is sufficient, and the heat pump can thus operate with a small pressure differential and a low power consumption. A theoretical power consumption of 15 kW alone for the heat pump for removing 1 metric ton of $CO_2$ gas with adiabatic compression is achievable, and it appears that this system satisfies a need even with a modest pump efficiency.

BRIEF DESCRIPTION OF THE DRAWING

The apparatus and its various functions are explained in detail below and with reference to the drawing, where.

BEST MODES FOR CARRYING OUT THE INVENTION

Figure 1:
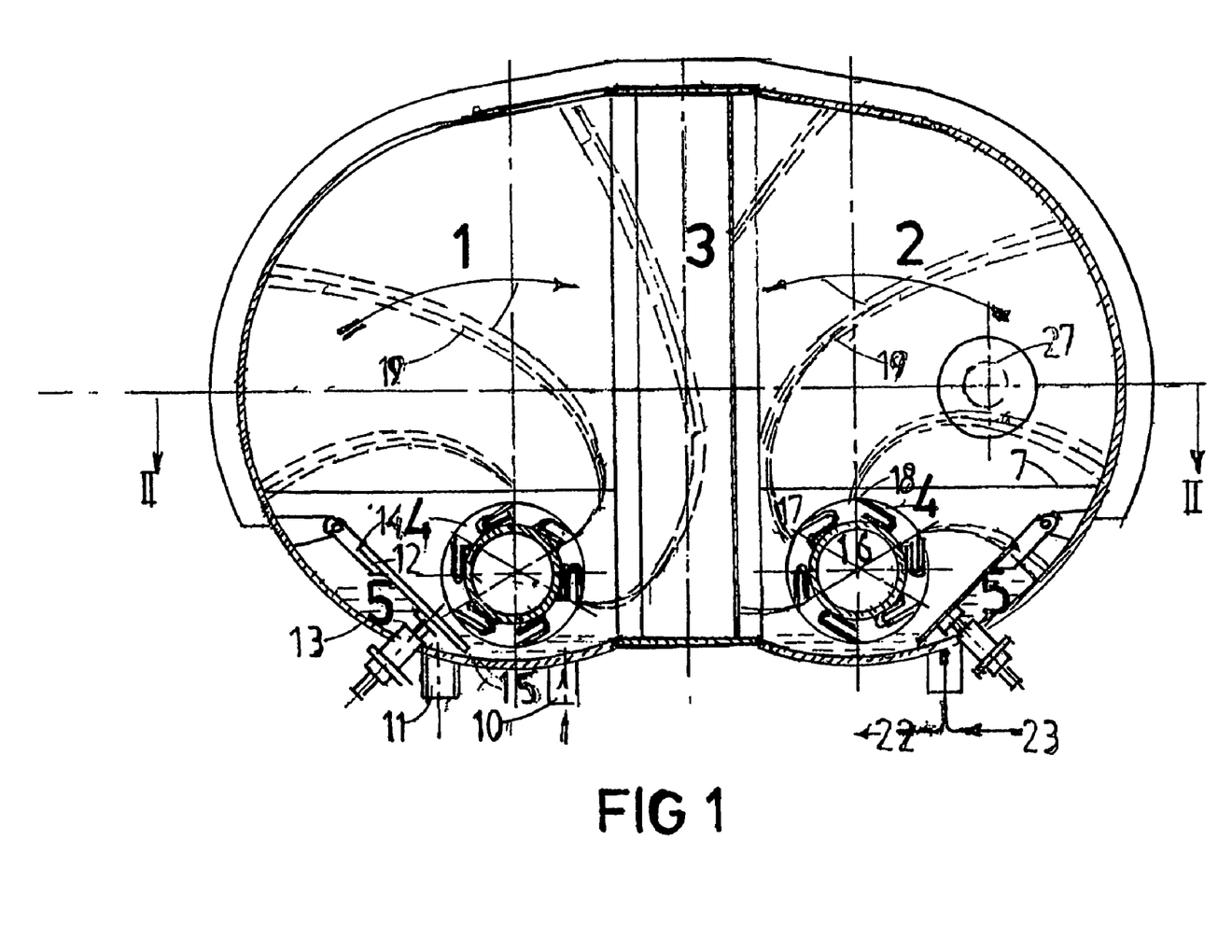
FIG. 1 shows a cross-section of the apparatus according to the invention.
Figure 2:
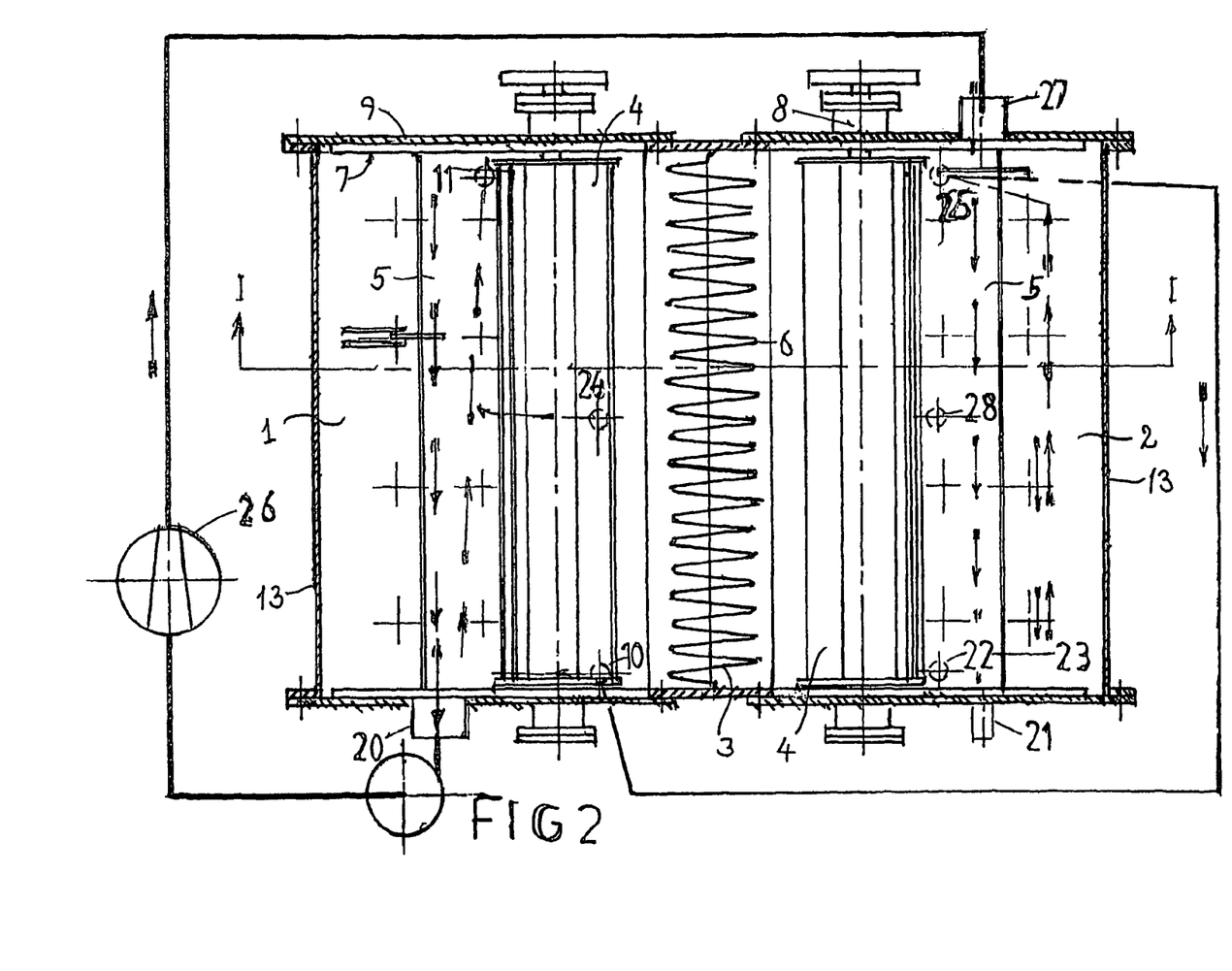
FIG. 2 shows a horizontal section through the apparatus according to the invention.

FIGS. 1 and 2 show a cross-section of the apparatus comprised of a stripping and strengthening section 1 and a condensing and final strengthening section 2 as well as a common heat transmission body 3 separating the two sections by constituting the common wall between the two sections. The remainder of the housing walls are preferably partially cylindrical walls 13 and end walls provided with a fixed part 7 for mounting of atomizing rotor bearings 8, while a remaining opening in the end walls is closed by means of removable covers 9 provided with various connections for liquid and vapour and simultaneously acting as a manhole cover. In principle, the components of the two sections are per se known and identical, their function, however, differs. Each section is provided with an atomizing rotor 4 and an axial liquid channel 5, the function of which is partly to control the inflow of liquid to the atomizing rotor 4 and partly to ensure axial transport of the liquid mixture through the apparatus, said transport having to occur horizontally due to the mode of operation. The common heat transmission body 3 is provided with a large surface area and a great stiffness by folding the plate into acute V-shaped folds 6, cf. FIG. 2, in a manner know per se, said folds alternately facing the opening to the atomizing system in the evaporation section 1 and the atomizing system in the condensing section 2, and where the operation in section 1 is based on the raw product being thrown outward against the heat transmission surfaces with a lot of force, and where an effective contact between liquid and vapour is obtained during the liquid being thrown outward from the atomizing rotor to impact on the heat transmission surface.

The evaporation section 1 is provided with a liquid inlet 10 for the raw product to be treated having an easily vaporizable component, or, if additional strengthening is required, with an inlet for reflux. In the latter case, the raw product has to be supplied to the axial liquid channel 5 at a position 24 relatively corresponding to the heat requirement for strengthening on one side and stripping on the other side. Liquid removal of the remanence takes place at an outlet 11. The treatment of the raw product between inlet and outlet is controlled by the V-shaped channel 5 formed between an inclined plate 12 and the housing wall 13. The top edge 14 of the inclined plate 12 is pivotably retained at a suitable distance to the housing wall so that the channel is provided with the cross-section area required for the axial flow of the liquid, while the bottom edge is adjustably retained so that an adjustable gap 15 is formed, wherethrough the liquid mixture can flow to the atomizing rotor 4 together with the liquid mixture flowing back from the heat transmission body 3 from the other side for repeated centrifuging. The portion of the centrifuged liquid mixture impacting on the wall above the channel flows back into said channel, and the gap 15 at the bottom of the channel has to be adjusted so that a possible increase in viscosity is compensated for and a suitable fall of the liquid level in the channel is obtained to drive the flow of the liquid towards the remanence outlet 11. The continual stepwise passage of the liquid mixture through the apparatus is controlled by controlling the inlet 10 and the outlet 11 so that the heat pump operates with a constant power consumption.

The atomizing rotor throwing out the liquid thus comprises partly the portion impacting on the wall above the channel 5, partly the portion impacting on the heat transmission body, and here the construction of the atomizing rotor 4 allows for achieving the desired progress of the throwing/atomizing. Said rotor is constructed with a central tube-shaped supporting mid-section 16 provided with a suitable number of U-shaped pockets 17 welded thereto, said pockets being open in the direction of rotation of the rotor. By adapting the transverse dimension and the depth of the pocket as well as the inclination to the circumference of the rotor, an effective contact between the liquid and the vapour as well as a sufficient flow of liquid to the heat transmission surface for evaporation is obtained during throwing in the entire cross-section area of the housing. At the same time, the surface can be kept free from encrustations even when using a high dry matter content, since the liquid is thrown with great velocity. The rotor 4 is mounted in the vicinity of the bottom of the apparatus, and when the liquid content in the apparatus is low, the sharpened edges 18 of the pockets can dip so deeply into the liquid that they fill with liquid during their passage, and as soon as the liquid in the pockets is brought up by the rotational speed of the rotor, centrifugal force will push the liquid beyond the outer edge 18 of the pocket in a film, thereby quickly disintegrating into small droplets forming a contiguous concentrated cloud 19, said cloud extending from the edge of the pocket towards the impact on the wall of the apparatus and on the heat transmission surface 6 and rotating with the speed of the atomizing rotor. When the liquid mixture is thrown outward against the heat transmission surface, the latter is supplied with a quantity of liquid considerably greater than the quantity to evaporate, and therefore concentration changes are not so extensive as to prevent a practically complete equilibrium between the concentration of the easily vaporizable component in the vapour and in the liquid.

The vapour generated in the stripping and strengthening section 1 flows forward towards an outlet 20 directly leading to a heat pump 26, optionally through an inserted splash guard. During this, the vapour is prevented from being circulated as a result of the atomizing rotor 4 dipping into the liquid at the bottom, and therefore, forward rotating clouds of liquid droplets 19 have to penetrate the vapour, where the droplets have an absolute velocity of approx. 10 m/s, but will achieve a relative velocity with respect to the vapour, said velocity possibly being in the range of on an average 30 m/s, and thus a particularly effective contact between liquid and vapour is achieved.

During the flow of the liquid mixture through the axial liquid channel 5 with repeated outlets to the atomizing rotor 4, the entire axial movement will be countercurrent to the generated vapour, and during each throwing intimate contact between the liquid mixture and the vapour in the free cross-section area is obtained, and thereby, an equilibrium between the concentration of the easily vaporizable phase in the liquid and in the vapour is reached before the liquid comes again into contact with the heat transmission surface. Since the amount of recirculated liquid is many times greater than the amount of vapour, the vapour generated during evaporation is in equilibrium with the evaporating liquid mixture, and since the generated vapour has a higher concentration of the easily vaporizable portion than the liquid, the concentration of the easily vaporizable portion in the liquid is reduced. After evaporation, when the liquid flows back to the atomizing rotor and is again thrown outward, it comes into contact with the countercurrent vapour having a higher temperature and a lower concentration of the easily vaporizable portion of the mixture. This disequilibrium is resolved by the vapour giving off heat to the liquid, thus giving rise to an additional evaporation of the easily vaporizable portion, i.e., during each step an easily vaporizable portion is transferred to the vapour in two ways, partly by direct evaporation from the liquid at the heat transmission surface and partly by means of subsequent contact between the liquid and the vapour during throwing out of the liquid. As a result of the stripping and rectification being carried out in the process volume costs can be saved for a separate stripping column, since the entire quantity of an easily vaporizable component can be stripped by establishing a sufficient number of steps, and as a result of the double output during stripping considerable savings with respect to power consumption are made compared to a conventionally constructed plant.

In principle, the stripping of ethanol and ammonia is identical despite the large temperature and pressure differences, and the fact that there is a quantity of $CO_2$ gas has only little influence on the stripping of ammonia, since after having been stripped from the liquid manure, the gas together with the vapour is immediately led to the next step of the process.

As mentioned above, stripping and strengthening of bioethanol is comparatively simple, and since normally the highest possible ethanol concentration is desired, fermentation broth has to be supplied to the apparatus at 24 due to the fact that the reflux from the condensing section 2 is led back to the evaporation section 1 through inlet 10. The stripped and strengthened ethanol vapour is compressed 26 and supplied to section 2 via the inlet 27. The vapour condenses in contact with the heat transmission surface 6 here acting as a cooling surface, and since the ethanol has already been strengthened as much as possible in the evaporation section 1, the ethanol concentration of the condensate formed in section 2 is identical to the one in the vapour, and thus, there is no strengthening in connection with the condensation. The obtained condensate together with the recirculated condensate is cooled down, and when it is subsequently thrown outward into contact with the vapour, an additional condensation of the vapour takes place, and thus, the entire operation is carried out with double strengthening effect. The strength is controlled by controlling the amount of product extracted through the ethanol outlet 22, and extraction of the reflux 25 is controlled by the atomizing rotor operating with constant energy consumption.

If the product from section 1 has not been concentrated as much as possible, the vapour flowing from the inlet 27 to the cooling surface forms a condensate having a lower ethanol concentration than the vapour, and the remaining vapour is thus strengthened. At the same time, the obtained condensate together with the recirculated condensate is cooled down, and when it is brought into contact with the vapour after having been thrown outward, the vapour is condensed and thus the remaining vapour is strengthened. Thus, ethanol is doubly strengthened with each recirculation of the condensate, and it is possible to treat fermentation broth completely without a conventional stripping and strengthening column, since it is possible to implement a heat pump having the necessary capacity, and it is not difficult to obtain the necessary number of recirculations for the condensate. It is thus possible to achieve the necessary strengthening by means of countercurrent condensation between vapour and condensate. Condensate corresponding to the reflux is extracted 25 from the end of the liquid channel 5, where the compressed vapour is supplied 27, the reflux is led back to the inlet 10 of section 1 and is returned to the stripping and strengthening of the process.

The vapour hereafter left in section 2 is strengthened as much as possible, and constitutes the product, and therefore, the final part of the condensation is a pure condensation without strengthening, and vapour and condensate can flow to the opposite end of the section in parallel, where the condensate is extracted from the axial liquid channel 5 through the outlet 22, while the vapour is completely condensed. However, the end cover is provided with a venting connection 21 for removing of optionally non-condensable components. As is apparent, it is possible to construct an apparatus for stripping and strengthening of ethanol from a fermentation broth without the need of using a conventional column, but resulting in considerable savings.

An apparatus of identical construction can be used to treat mixtures comprising a quantity of ammonium bicarbonate, for example for treatment of liquid manure supplied through the inlet 24, since the concentration of ammonia is so low that it is necessary to operate with additional strengthening, and the reflux is led back to the stripping section through the inlet 10. Stripping is practically independent of the quantity of $CO_2$ gas, which continues to stream in the process together with the stripped ammonia-containing steam, the latter being strengthened during its passage to the outlet 20 to the heat pump 26. Heat transfer during stripping presents no difficulties, since the liquid manure is thrown against the heat transmission surface, and the reflux in the strengthening part of section 1 is pure distillate, which also does not cause difficulties.

After compression by means of the heat pump 26 the vapour/gas mixture is led through the inlet 27 into section 2, and flows to the opposite end of the section under constant contact with the heat transmission surface. Thus, the obtained condensate is in equilibrium with the vapour having provided the condensate, which means that the concentration of ammonia in the condensate is only approx. ¹/₁₀ of the concentration in the vapour, and the remaining vapour has thus been strengthened. Additionally, the condensate thrown inward against the heat transmission surface, said surface now acting as a cooling surface, is cooled down, and when said condensate has run off down to the atomizing rotor 4 and has come into contact with the warmer countercurrent vapour after having been thrown outward, the latter resulting in a further strengthening of the ammonia vapour, each recirculation of the condensate carries with it a double strengthening of the ammonia in the vapour, and thus it is obvious that ammonia can be sufficiently strengthened without investing in a conventional strengthening column.

At the beginning of the condensation, there is a minor partial pressure deriving from $CO_2$ gas, said pressure increasing as the vapour condenses, and this may have the side effect that the gas be carried along during condensation of the vapour, and since said gas cannot be condensed, it will form a layer covering the cooling surface, said layer preventing the vapour from contacting the cooling surface. For a conventional condenser, this may have a completely devastating effect, while with the novel system, however, it only has a limited effect, since the gas does not prevent the condensate from being thrown against the cooling surface and thus from being cooled down, possibly together with the condensate from the vapour entrained with the condensate which is thrown out. During subsequent throwing with contact between liquid and vapour, the cooled condensate in contact with the warmer vapour receives a further strengthening.

When the vapour, during condensation, has progressed so far in the apparatus that the necessary reflux condensate in countercurrent with the vapour is led back to section 1 from the outlet 25 in section 2 to the inlet 10 in section 1, the vapour with the increasing concentration of $CO_2$ gas could continue to flow in the apparatus in parallel with the obtained condensate, but since partial pressure of the gas increases, the condensation temperature falls so drastically that the condensation heat cannot be transferred for the evaporation, and venting the gas is accompanied by a corresponding volume of vapour, resulting in a loss for evaporation. The solution of introducing an additional evaporator body in section 1 is rather complicated, and it has been found that the problem is solved with the novel system by absorbing ammonia with supplied water.

In the novel method, a volume of water is supplied to the axial liquid channel at the connection of the end cover 23, said volume being sufficient to obtaining an effective scrubbing of $CO_2$ gas and complete condensation of ammonia in the vapour. Subsequently, the water continues together with the absorbed condensate in countercurrent with the vapour and the gas and with constant absorption of condensate, until the amount of ammonia in the condensate corresponds to the nitrogen content of the liquid manure, taken in from the axial liquid channel through an outlet connection 28 positioned where the desired concentration is achieved.

The $CO_2$ gas is led out through the outlet connection 21. The gas can be condensed, in case there is use for it, however, the compressor may have to deliver a pressure in the range of 70 bar, this solution being achievable, since cooling plants exist using said gas as a coolant.

The obtained solution for achieving an economic separation of ammonia and $CO_2$ from a solution comprising ammonium bicarbonate can optionally also be an alternative for removing $CO_2$ gas from flue gas with ammonia, since an ammonia/water mixture can separate the gas by scrubbing such a mixture at a suitable temperature. A contributing factor to this very economic solution is the fact that binding of 44 kg $CO_2$ uses only 17 kg ammonia, which in turn is recovered. Scrubbing can be carried out by means of the apparatus disclosed in EP 1 185 346 B1, since it is possible to add liquid media at different places in the axial liquid channel so that the final scrubbing can be carried out with for example pure water.

After having passed the scrubber, the liquid mixture is led to section 1, inlet 10 of the apparatus, or, if strengthening is required, to inlet 24 having a suitable position between inlet 10 and outlet 11, corresponding to the required strengthening. The supply inlet does not need to have a fixed connection with the liquid channel, since the atomizing rotor will bring the supplied liquid immediately into regular recirculation. Since the separation of $CO_2$ gas can be carried out at a comparatively high ammonia concentration, only pure stripping or only light strengthening is expected to be necessary, and thus, the heat pump has favourable operating conditions. A theoretical power consumption of 14 kW with adiabatic compression of a quantity of vapour corresponding to stripping 1 metric ton of $CO_2$ gas alone for driving the compressor is apparently achievable, and since the apparatus can provide stripping and strengthening without the need for a conventional stripping and strengthening column, the investment is rather modest. The only drawback of the system is the small capacity of a single unit compared with the needs of a power plant.

The invention claimed is:

1. Apparatus for stripping with strengthening and subsequent condensing and strengthening of an easily vaporizable component of an aqueous mixture, wherein the heat necessary for stripping and strengthening is transferred through a common heat transmission body (3), where the heat is derived from condensing the vapour generated by stripping and strengthening, which vapour via compression using a heat pump (26) has obtained the increase in boiling point necessary for condensation, said apparatus being comprised of two sections, namely a stripping and strengthening section or first section (1) and a condensing and final strengthening section or second section (2), said sections being joined around a common heat transmission body (3) forming a dividing wall, each section being further defined by a horizontal partially cylindrical housing (13) and an end wall at each end, and where each of said sections is provided with an atomizing rotor (4) adapted to throw liquid from each side from the bottom of the horizontal partially cylindrical housing (13) inward against the common heat transmission body, an axial liquid channel (5) providing a continuous passage of liquid through the apparatus extending along the bottom.

2. Apparatus according to claim 1, characterised in that each of the axial liquid channels is partly defined by an adjustable plate forming an adjustable gap at the bottom of the channels.

3. Apparatus according to claim 1, characterised in that the stripping and strengthening section (1) is provided with a liquid inlet (24), positioned at the bottom of the partially cylindrical housing (13), between the end walls of the housing (13) and with a remanence outlet (11) positioned at the bottom of the partially cylindrical housing (13) adjacent to a first end wall (9) of the housing, and with a vapour outlet (20) in the opposite second end wall, and that the vapour outlet (20) is connected to the condensing and final strengthening section (2) by a vapour inlet (27) by means of a heat pump (26), said vapour inlet being arranged in the first end wall of the condensing and final strengthening section (2) adjacent to the first end wall (9) of the stripping and strengthening section (1), and that the condensing and final strengthening section (2) is provided with a reflux outlet (25) arranged at the bottom of the partially cylindrical housing (13) adjacent to the first end wall and in connection with a reflux inlet at the bottom of the stripping and strengthening section (1) adjacent to its second end wall, and with a condensate outlet (28) positioned at the bottom between its two end walls, and with a vapour outlet (21) arranged in the second end wall opposite the first end wall.

4. Apparatus according to claim 3, characterised in that the condensing and final strengthening section (2) is provided with a warm water inlet (23) at the bottom in close vicinity to the second end wall.

5. Apparatus according to claim 1, characterised in that the apparatus is part of a system for removing $CO_2$ from flue gas, where the mixture of ammonia and water is supplied to a scrubber, where the flue gas is supplied to one end of the scrubber and the ammonia/water mixture is supplied to the other.

* * * * *